United States Patent [19]

Clayton et al.

[11] Patent Number: 4,675,210

[45] Date of Patent: Jun. 23, 1987

[54] MALEIC MODIFIED BUTENE COPOLYMERS FOR ADHERING POLYPROPYLENE

[75] Inventors: Anthony B. Clayton; Brian D. Kramer, both of New Castle County, Del.

[73] Assignee: Hercules Incorporated, Wilmington, Del.

[21] Appl. No.: 831,779

[22] Filed: Feb. 20, 1986

Related U.S. Application Data

[62] Division of Ser. No. 659,585, Oct. 10, 1984, Pat. No. 4,599,385.

[51] Int. Cl.$^4$ .......................... B05D 5/10; B05D 3/02
[52] U.S. Cl. .......................... 427/208.2; 156/244.11; 427/27; 427/195; 427/208.4; 427/388.2; 427/393.5; 427/407.1; 427/407.2; 427/408; 427/409

[58] Field of Search ................ 156/244.11; 427/208.2, 427/208.4, 393.5, 388.2, 407.1, 409, 27, 195

[56] References Cited

U.S. PATENT DOCUMENTS

| | | | |
|---|---|---|---|
| 3,433,777 | 3/1969 | Brunson | 525/285 X |
| 3,481,910 | 12/1969 | Brunson | 525/285 |
| 3,617,351 | 11/1971 | Long et al. | 427/194 |
| 3,919,196 | 11/1975 | Meyer et al. | 525/285 |
| 3,932,368 | 1/1976 | McConnell et al. | 525/285 |
| 4,031,062 | 6/1977 | Shirayama et al. | 525/285 |
| 4,308,084 | 12/1981 | Dhtsuki et al. | 427/208.2 X |

*Primary Examiner*—Thurman K. Page
*Attorney, Agent, or Firm*—William S. Alexander

[57] ABSTRACT

Graft copolymers are disclosed wherein maleic acid or maleic anhydride is grafted to a poly(propylene--butene) backbone. The grafts are useful materials for adhering polypropylene to other materials.

7 Claims, No Drawings

MALEIC MODIFIED BUTENE COPOLYMERS FOR ADHERING POLYPROPYLENE

This application is a division of application Ser. No. 659,585 filed Oct. 10, 1984 now U.S. Pat. No. 4,599,385.

This invention relates to modified copolymers of propylene and butene-1 containing about 0.1 to 5% by weight of chemically combined maleic acid or anhydride. Specifically, the modified copolymer is a crystalline copolymer of about 1 to 50% butene-1 and 99 to 50% propylene. In another aspect, it relates to use of the aforesaid modified copolymer as an adhesive for bonding a polypropylene coating to a polar substrate.

BACKGROUND OF THE INVENTION

It has been known for a number of years that homopolypropylene can be modified by grafting an unsaturated dibasic acid or acid anhydride moiety onto the polymer backbone. The polarity imparted to the otherwise nonpolar, highly inert polymer enables the polymer to be adhered to other polar substrates to which it would not ordinarily adhere.

Maleic modified polypropylene has been a commercial success in both the amorphous form and the crystalline form. Modification is effected up to about the 5% by weight level to provide good adhesion to, e.g., metals, glass, wood and polar polymers. In specific applications, the maleic modified polymer is employed as a coating for glass fibers which are to be used to reinforce shaped polyolefin objects, resulting in very significant increases in tensile strength and heat deflection temperature. In another application, the modified polymer is employed as a primer layer or is blended into the polypropylene to adhere polypropylene coatings to metal or to other polymers.

It has also been suggested in U.S. Pat. No. 3,433,777 to effect maleic anhydride modification of amorphous copolymers of propylene and 1-olefin including butene-1, hexene-1 and pentene-1. It is alleged that these modified polymers are useful in adhesives.

STATEMENT OF INVENTION

In accordance with this invention, there are provided modified crystalline copolymers of propylene and butene-1 wherein the copolymer is composed of about 1 to 50 weight percent butene-1 and 99 to 50 weight percent propylene, preferably about 1 to 25% butene-1 and 75 to 99% propylene, and which contain 0.1 to 5 weight percent of maleic acid or anhydride grafted onto the polymer backbone.

In another aspect, the invention provides a method of bonding polypropylene to a polar substrate, e.g., glass, metal or a polar polymer, which comprises interspersing, between the polypropylene and the polar substrate, an adhesive comprising a crystalline copolymer of propylene and butene-1 containing about 1 to 50 weight percent butene-1, preferably about 1 to 25%, said copolymer being modified by grafting thereto about 0.1 to 5% by weight of maleic acid or anhydride.

The novel graft copolymers of this invention can be prepared by a solution process. The solution reaction is carried out via free radical polymerization in the presence of a peroxide initiator, at an elevated temperature required to cause dissolution of the backbone polymer. Useful solvents include such things as chlorobenzene, hexane, heptane and kerosene, all of which are mutual solvents for the backbone polymer and the peroxide catalyst and are inert to free radical formation in the presence of the peroxide.

Another preferred method of forming the graft copolymer is the vapor phase or solvent free method. In this case, the polymer is heated to a temperature below the softening point but sufficient to decompose the peroxide. Peroxide is applied, as by spraying, to the surface of the polymer and, after complete dispersal thereof throughout the reactor, the acid or anhydride is added and allowed to react. Procedures for preparing the graft copolymers are essentially those known in the art for preparing maleic modified polypropylene and do not per se form a part of this invention.

EXAMPLE 1

Fifty (50) parts of a crystalline, random propylene—butene-1 copolymer containing 8.5 mole % (11 wt %) of butene-1 and 7.5 parts of maleic anhydride were dispersed in 316 parts chlorobenzene under a nitrogen blanket. The mass was heated to reflux. When all of the copolymer and maleic anhydride had dissolved, 2 parts of t-butyl perbenzoate was added dropwise and reacted at reflux for about 3 hours and 15 minutes, maintaining the nitrogen blanket. The reaction mass was cooled to room temperature and the maleic modified copolymer was precipitated with toluene. Precipitated product was filtered, washed with acetone, then with 50° C. water, then once again with acetone, and dried, yielding 53 parts of product.

The recovered modified copolymer had intrinsic viscosity (I.V.) of 0.55 dl./gm. and contained 2.54% by weight combined maleic anhydride content, determined by titration.

EXAMPLE 2

The procedure of Example 1 was repeated using 100 parts of the copolymer, 5 parts maleic anhydride, 632 parts chlorobenzene and 0.7 parts t-butyl perbenzoate, and 98.5 parts of product was recovered. The product had I.V. of 0.92 and maleic anhydride content of 0.76% by weight.

EXAMPLE 3

Example 2 was repeated using a copolymer containing 9.6 mole % (12.4 wt %) butene-1 and having IV of 1.85. Ninety-six (96) parts grafted product was recovered having I.V. of 1.02 and about 0.8% maleic anhydride content by weight.

EXAMPLE 4

Example 2 was repeated using a copolymer containing about 2% butene-1 and having I.V. of 2.43. The grafted product had I.V. of 0.809 and contained about 0.8% maleic anhydride by weight.

EXAMPLE 5

Example 2 was repeated using sixty (60) parts of a copolymer containing 38.9% butene-1 by weight and having I.V. of 1.14, 816 parts chlorobenzene, 3 parts maleic anhydride and 0.42 part t-butyl perbenzoate. The run yielded 54 parts maleic modified copolymer product having I.V. of 1.0 and 0.42% maleic anhydride.

The modified propylene—butene-1 copolymer of this invention can be employed per se as a primer layer between the polar substrate and the non-polar polypropylene or it can be blended with the polypropylene and the blend applied directly. If the modified copolymer is to be employed as a primer layer, it is usually applied to the polar substrate as a powder coating and adhered by heating and fusion into a continuous film. Alternatively, the modified copolymer can be dissolved in a hot solvent and applied as by brushing or spraying. The powder coating technique followed by fusion is preferred.

Application of the polypropylene layer to the primed substrate can be accomplished in any convenient way such as by extrusion coating or lamination with a preformed film. Powder coating is also possible if desired. Whatever technique is employed, the adhesion of the polypropylene to the polymer substrate is very good.

The modified copolymers of this invention are also particularly valuable for applying polypropylene coatings to metal. One metal coating application in which polypropylene is favored is in coating the interior of washing machines and dishwashers where its chemical inertness to the corrosive environment resulting from the detergent is highly favorable. In the past some difficulty has been encountered in this application because the primers heretofore used have not been as resistant as desired to the detergent action. The crystalline, modified copolymers of this invention have been found to exhibit significantly better resistance to detergents than does the best primer known to date, namely maleic-anhydride modified polypropylene.

Another application where a primer is desired in order to adhere polypropylene to a polar material is in preparing glass fiber reinforced polypropylene objects. In this case, it is desirable to blend the modified copolymer into the polypropylene. Also, it is usually necessary to use a slightly higher ratio of modified copolymer to polypropylene than in the case where it is applied as a primer coating because the copolymer is dispersed throughout the polypropylene phase rather than being concentrated at the interface between the polar and nonpolar materials. Thus, a mixture of glass fibers, polypropylene, and the modified copolymer can be dry blended and injection molded to yield fiber reinforced objects having improved tensile properties.

The blending technique is also useful in metal coating applications as, e.g., the home appliance applications discussed above. The polymer and modified copolymer blend can be applied to the metal substrate by extrusion or by a powder coating technique. Adhesion is excellent either way.

The modified propylene-butene-1 copolymers of the invention are also useful as adhesives for bonding polypropylene to polar polymers. Increasingly, polypropylene is being laminated with polar polymers such as poly(vinylidene chloride), ethylene-co-vinyl alcohol (i.e., the hydrolysis product of ethylene—vinyl acetate copolymer or EVOH), polyamides and polyesters to provide structures having properties, e.g., vapor barrier properties, lacked by polypropylene alone. A vapor barrier is almost always required in polypropylene films or containers intended to be used for food packaging.

To prepare polymer laminates of polypropylene and polar polymer films using the modified propylene—butene-1 copolymer as the adhesive, the methods described above can be employed. More frequently, however, such laminates will be prepared by a coextrusion technique wherein layers of molten polypropylene, modified copolymer, and polar polymer are simultaneously extruded to form a layered sheet. These sheets can be used as prepared or, more usually, they are drawn to biaxially oriented film or converted to containers by thermoforming. The good adhesion between layers is retained following the post-extrusion drawing or fabrication steps.

The following examples illustrate the use of the modified copolymers of the invention.

EXAMPLE 6

The graft copolymer prepared in Example 1 was mixed at a concentration of 1.1 parts per hundred parts of polypropylene with homopolypropylene of I.V. 2.5 (Profax 6501-Hercules Incorporated, Wilmington, Del.) and aminosilane treated glass fiber. The mixture was tumble blended for about one hour. Portions of the blend were injection molded to form test bars. Physical properties were determined for these materials to be as follows:

| Property | Treated Sample | Untreated Control |
|---|---|---|
| Flex Modulus (psi) | 628,000 | 662,000 |
| Tensile Strength (psi) | 9,794 | 6,653 |
| Elongation at Yield (%) | 2.8 | 3.2 |
| Heat Deflection Temp. at 66 psi (°C.) | 156 | 128 |
| Heat Deflection Temp. at 264 psi (°C.) | 141 | 78 |
| Notched Izod Impact Strength (ft-lbs) | 2.1 | 2.5 |

EXAMPLE 7

A powder coating was prepared by blending 40 parts by weight of the modified propylene—butene-1 copolymer of Example 2 with 360 parts by weight of propylene homopolymer of I.V. about 1.5. A Henschel Mill mixer was used at 3000 rpm for 3 minutes.

The blended powder was applied to zinc phosphate surface treated B-100 steel panels [commercial test panels produced and sold by the Parker Company, P.O. Box 201, Detroit, Mich. 48220] using an electrostatic gun. Similar panels were prepared wherein the coating is an unblended maleic anhydride modified propylene—butene-1 copolymer. Coating was carried out in two steps to achieve a coating thickness of about 7 to 8 mils. A first application was made, followed by fusion at 425° C. for five minutes then a second application, followed by a second fusion, also at 425° C. for five minutes.

The coated panels were subjected to impact testing and to detergent resistance testing. Impact testing was carried out according to ASTM D2794-69.

In the detergent test, a panel is "X scored" completely through the coating to the metal surface and placed in a 1% bath of a conventional commercial detergent ("Tide" by Procter & Gamble) at 190° C. for seven days and the amount of disbonding is recorded.

Results of these tests are recorded in the following table along with results of testing of a similar powder coating containing maleic anhydride modified polypropylene. In the table, coating A is the 60/40 blend of polypropylene and the maleic modified propylene—butene-1 copolymer, coating B is the 60/40 blend of polypropylene and maleic modified polypropylene, coating C is unblended maleic modified propylene—butene-1 copolymer and coating D is unblended maleic modified polypropylene.

| Coating | Thickness | Impact Strength | | Detergent Resistance | |
|---|---|---|---|---|---|
| | | Direct | Indirect | 7 days | 12 days |
| A | 7.0 mil | P-100/F120 | P80/F100 | no attack | no attack |
| B | 7.0-7.5 mil | P140/F160 | P140/F160 | no attack | disbonded |
| C | 7.0 mil | P20/F30 | —/F10 | no attack | no attack |
| D | 6.0 mil | P40/F50 | P10/F20 | disbondment | some flaking |

The disbonding of the unblended maleic anhydride modified polypropylene at 7 days had proceeded to about ⅛ inch and a few rust spots were visible. By twelve days the disbonding had advanced to ¼ inch and many rust spots were visible.

EXAMPLES 8-10

The modified copolymers of Examples 3, 4 and 5 were dry blended at the 2.5% level into a 7% ethylene—propylene block copolymer having I.V. of about 2.5 (Profax 7501-Hercules Incorporated, Wilmington, Del.). The resulting mixtures were extruded into 25 mil sheets. These sheets were used as the inner bonding layer between steel panels and also between aluminum panels. Bonding was effected under 10,000 pounds pressure for 2 minutes at 205° C. in the case of steel and at 180° C. in the case of aluminum. The bonded panels were cut into 1" strips and 90° T-peel measurements were made according to ASTM D-1876.

Simultaneously, the same tests were carried out with a control comprising a blend of the same polypropylene and maleic anhydride modified crystalline homopolypropylene containing about 0.5% combined maleic anhydride by weight.

| Ex # | Copolymer | T-Peel Result | |
|---|---|---|---|
| | | Steel | Aluminum |
| 8 | Ex 3 | 80 lbs/in | 129 lbs/in |
| 9 | Ex 4 | 82.6 lbs/in | 116.6 lbs/in |
| 10 | Ex 5 | 84 lbs/in | 111 lbs/in |
| Control | — | 66 lbs/in | 89.6 lbs/in |

The increase in adhesion gained by use of the maleic anhydride modified copolymer of this invention over the adhesion effected with the control, a widely used and highly favored adhesive for this same purpose, is clearly evident.

EXAMPLES 11-16

Another series of laminates was prepared with steel panels in the same manner as described in Examples 8 to 10 except that these were bonded at a range of temperatures all of which are lower than the temperatures employed in Examples 8 to 10. Also, one series was prepared with a 10% level of the modified copolymer blended into the polypropylene. Results of the T-peel test are recorded in the following table. Again, it can be seen that test results are better in all cases than the results of the control test wherein maleic anhydride modified homopolypropylene was used.

| Ex # | Modified Copolymer | Conc. | T-Peel (lb/in) | | | | | | |
|---|---|---|---|---|---|---|---|---|---|
| | | | 140$^a$ | 145 | 150 | 155 | 160 | 165 | 170 |
| 11 | Ex 6 | 2.5% | — | — | — | 30 | 45 | 62 | 66 |
| 12 | Ex 5 | 2.5% | — | — | 5 | 25 | 55 | 74 | 119 |
| 13 | Ex 3 | 2.5% | — | — | 18 | 19 | 60 | 60 | 71 |
| Control | | 2.5% | — | — | — | — | 20 | 30 | 60 |
| 14 | Ex 4 | 10% | — | — | 9 | 40 | 90 | 100 | 133 |
| 15 | Ex 5 | 10% | — | 12 | 20 | 20 | 60 | 110 | 110 |
| 16 | Ex 3 | 10% | 15 | 13 | 16 | 20 | 54 | 52 | 70 |
| Control | | 10% | — | — | — | 17 | 34 | 67 | 75 |

$^a$bonding temperature °C.

What we claim and desire to protect by Letters Patent is:

1. A method of applying a layer of polypropylene to a polar substrate which comprises applying said layer in the presence of a crystalline copolymer comprised of about 1 to 50% by weight of butene-1 and about 99 to 50% by weight of propylene, said copolymer having about 0.5 to 5% by weight of maleic acid or maleic anhydride, based on the weight of said copolymer, chemically combined therewith, whereby the said modified copolymer is in contact with both the layer of polypropylene and the polar substrate to effect bonding between the polypropylene and the substrate.

2. A method of adhering polypropylene to a polar material which comprises applying said polypropylene in the presence of a crystalline copolymer comprised of about 1 to 50% by weight of butene 1 and about 99 to 50% by weight of propylene, said copolymer having about 0.5 to 5% by weight of maleic acid or maleic anhydride, based on the weight of said copolymer, chemically combined therewith, whereby the said modified copolymer is in contact with both the polypropylene and the polar material to effect bonding.

3. The method of claim 1 wherein the polar substrate is a metal.

4. The method of claim 1 wherein the polar substrate is a polar polymer.

5. The method of claim 1 wherein the modified copolymer is blended into the polypropylene prior to applying said polypropylene to the polar substrate.

6. The method of claim 5 wherein the polar substrate is a film-forming polar polymer and contacting of the polar polymer and the polypropylene layer is effected via coextrusion.

7. The method of claim 1 wherein the polar substrate is a polar polymer and contacting of the layers with the modified copolymer is effected by coextruding a layer of said copolymer between a layer of polypropylene and a layer of the polar polymer.

* * * * *